Dec. 12, 1950 A. PITT 2,534,056
DEFERRED ACTION BATTERY
Filed May 15, 1947 2 Sheets-Sheet 1
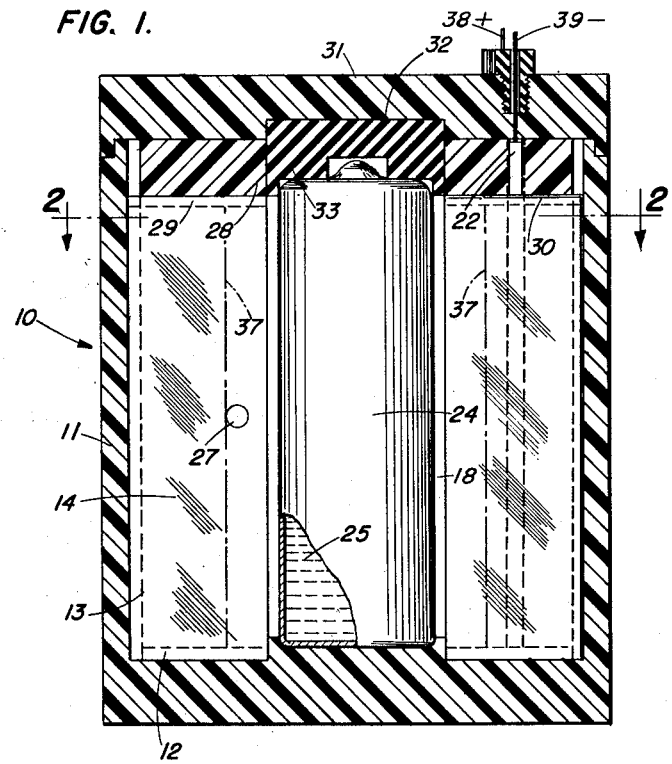
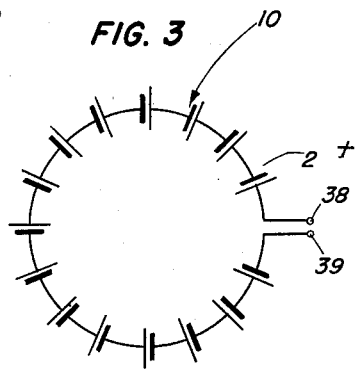
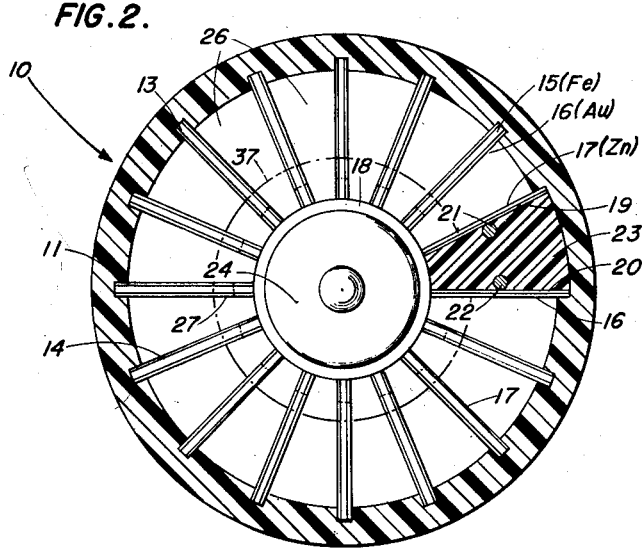
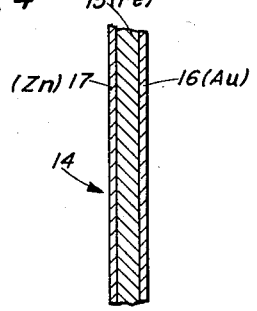
INVENTOR
ARNOLD PITT
BY
ATTORNEY Dec. 12, 1950 A. PITT 2,534,056
DEFERRED ACTION BATTERY
Filed May 15, 1947 2 Sheets-Sheet 2
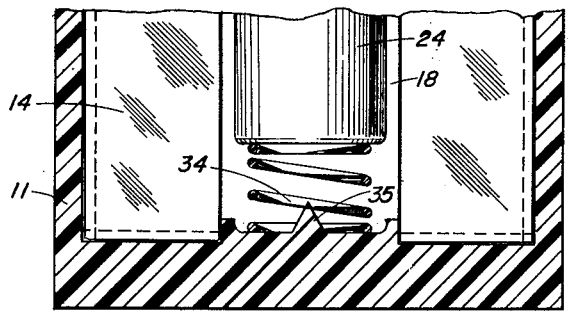
FIG. 5
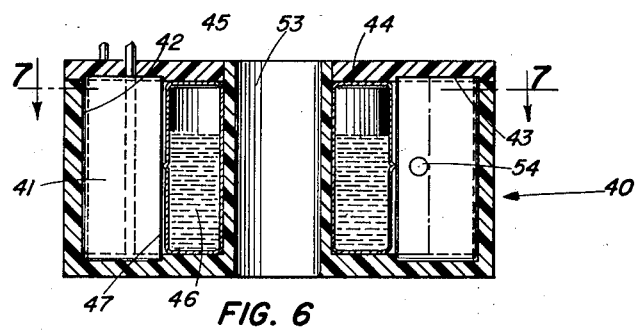
FIG. 6
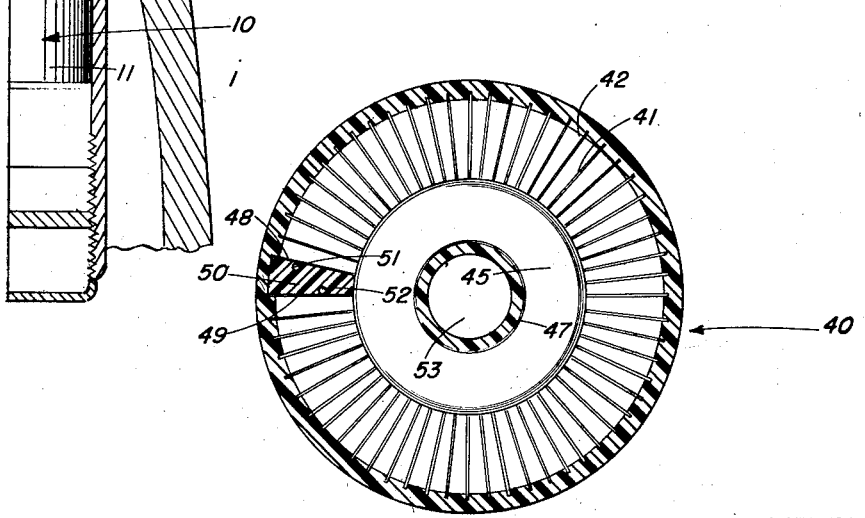
FIG. 8
FIG. 7
INVENTOR
ARNOLD PITT
BY
ATTORNEY Patented Dec. 12, 1950

2,534,056

UNITED STATES PATENT OFFICE 2,534,056

DEFERRED ACTION BATTERY

Arnold Pitt, Weston, Ontario, Canada

Application May 15, 1947, Serial No. 748,245

6 Claims. (Cl. 136—90)

This invention relates generally to electrical batteries and more particularly to a deferred action primary battery useful especially in electrically detonated projectiles.

One of the principal objects of the present invention is to provide, in a projectile, a galvanic source of electrical potential which will remain inactivated during periods of storage and which will be activated and made ready for use within a predetermined, short period of time following the discharge of the projectile from a rifled ordnance.

Another object of the invention is to provide a galvanic battery for use in conjunction with radio-proximity fuzes which is extremely small in size but which is capable of providing all of the voltages needed for operation of the fuze.

A further and more specific object of this invention is to provide a galvanic source of electrical energy for an electrically detonated artillery projectile which utilizes a plurality of separate serially connected cells each having radially arranged plate-like electrodes with their inner edges confronting a centrally arranged cavity for the contained liquid electrolyte in such manner that forces of inertia acting on said liquid electrolyte will cause it to be distributed into conductive contact with the electrodes.

A still further object of the invention is to provide, in a galvanic battery, means for insuring proper distribution of electrolyte in all the cells, upon the imposition of inertial forces upon said electrolyte at the time a shell containing the battery is fired from an ordnance piece.

Other objects and advantages of this invention will become apparent from a reading of the specification, the specific features of certain preferred modifications being hereinafter described in detail in connection with the accompanying drawings, in which:

Fig. 1 is an axial sectional view, partly in elevation, of a preferred embodiment;

Fig. 2 is a transverse sectional view of the embodiment shown in Fig. 1, on the line 2—2 of Fig. 1;

Fig. 3 is a circuit diagram showing the serial connection for the several cells of the embodiment illustrated in Figs. 1 and 2;

Fig. 4 is an enlarged fragmentary detail sectional view of one of the plate-like electrodes shown in Figs. 1 and 2;

Fig. 5 is a fragmentary vertical sectional view, partly in elevation, of a modification of the embodiment illustrated in Fig. 1;

Fig. 6 is an axial sectional view of a further embodiment;

Fig. 7 is a transverse sectional view on the line 7—7 of Fig. 6; and

Fig. 8 is a fragmentary vertical sectional view showing my improved battery mounted in an electrically detonated projectile.

Referring now to the drawings, and especially to Figs. 1 and 2, a galvanic battery according to one embodiment of my invention is indicated generally at 10. The battery 10 is designed for incorporation in an electrically operated rotationally stabilized projectile so that its longitudinal axis will be coincident with the axis of spin of the projectile.

The battery assembly comprises an external cylindrical casing 11 of suitable plastic material such as methyl methacrylate. The base of this casing is provided with a plurality of radial grooves 12 which communicate with an equal number of radially spaced and axially directed grooves 13 that are cut in the internal side wall of the casing. Into each of these radially and axially aligned grooves is inserted and cemented in place a plate-like electrode assembly 14 including a plate 15, of sheet iron for example, opposite lateral surfaces of which are provided respectively with layers or coatings 16 and 17 of different metals of the electro-chemical series; e. g., gold and zinc.

The layers or coatings 16 and 17 may be applied by plating operations known to the art. Each of the plates 15 is of rectangular shape and all are of equal size and, when positioned and cemented in their respective grooves, define a central cavity 18 from which they radiate, in the manner of spokes of a wheel, to form a plurality of sector shaped pockets or cells 26 for the electrolytes of the several cells. The consecutive composite plate-like electrodes 14 are assembled so that, in each cell, the coatings 16 and 17 of the different metals of the electro-chemical series, e. g., zinc and gold, are in confronting relation and so that two plate-like electrodes, at the ends of the series and designated 19 and 20, have their exposed surfaces coated respectively with the different metals e. g., gold and zinc, but have their other lateral surfaces uncoated, terminal conductors 21 and 22 being soldered or otherwise secured to said uncoated surfaces substantially throughout their lengths. Moreover, each of these plates 19 and 20 is secured by cementing, for example, to the exposed lateral surfaces of a plastic block 23 which is rigidly retained in the container by being cemented in a suitably shaped groove, or which may be cast integrally with the casing.

A cylindrical frangible ampoule 24, of glass, for example, containing a predetermined volume of liquid electrolyte 25, e. g., a sulphuric acid solution, is positioned within the cavity 18.

The volume of the cells 26 defined by the electrode assemblies should be calculated to correspond with the volume of liquid electrolyte for the ampoule 24, so that the level of said electrolyte in said cells, when released from the ampoule, will produce optimum cell activation. Figs. 1 and 2 of the drawings show, by dotted lines 37, the desired level of the liquid electrolyte 25 when the same is equally distributed within the various cells 26. The means facilitating the distribution of electrolyte to provide equality of filling of the several cells comprise small openings 27 which are provided in the plate assemblies 14 at the border of the predetermined liquid electrolyte level 37.

By means of the openings 27 excess liquid in any one cell will be caused to flow into an adjacent cell to provide for the equal distribution indicated in dotted lines 37, with the liquid level inwardly of the openings. If these openings were not positioned outwardly of this border the electrolyte by being distributed throughout these openings and between the cells would short circuit said cells.

An annulus 28, also provided with a plurality of radial grooves 29 and a sector groove 30, is adapted to be positioned within the housing 11 so that each of the composite electrode-assemblies 14 and the plastic block 23 will be retained in their respective grooves.

A cover plate 31 is provided with an inner axial recess 32 having a cup-like cushion 33 of rubber or other resilient material seated therein and extending through the annulus axially thereof to protect the ampoule against damage from shocks accidentally incurred.

As shown in the drawing the ampoule 24 is mounted longitudinally on the axis of the battery in the cavity 18. The wall of the ampoule 24 is of such thickness that said ampoule will be unable to withstand the forces of inertia (set back forces) incident upon discharge of the projectile from a rifled gun and will shatter, thus freeing the electrolyte 25. It may be desired, as an alternative to the construction illustrated in Fig. 1, to provide a breaker mechanism in accordance with the modification shown in Fig. 5. Here the breaker mechanism for the ampoule comprises a coil spring 34 for normally retaining the ampoule above a pointed breaker element 35, axially aligned with the ampoule so that set back forces will cause said ampoule to depress the spring and cause a shattering impact between the ampoule and said element 35.

Upon shattering of the ampoule 24, either by impact with breaker element 35, or with the bottom wall of the battery casing 11, the electrolyte 25 will be caused by inertial forces to flow immediately from the ampoule into the bottom of said casing. Since each of the cells 26 defined by the several plate assemblies is open to the central cavity 18, the liquid electrolyte will, responsive to the centrifugal force developed on rotation of the projectile, be displaced from the central well outwardly into each of said cells 26. As a result of this centrifugal force, the liquid level in each cell will be such that optimum cell activation will take place. As previously described, equal distribution of this liquid electrolyte by the centrifugal force is achieved by the path of flow from each cell to the next through the openings 27 in the several plates at the boundary of the final predetermined liquid level. The electrolyte is held at the level indicated at 37 by the continued rotation of the projectile.

As illustrated diagrammatically in Fig. 3, all of the cells are connected in series by virtue of the composite electrode structure 14, and this series voltage is obtained across terminal conductors 38 and 39, brought out through the top cover plate 31.

In Figs. 6 and 7 a further embodiment of the invention is illustrated, wherein the cylindrical casing 40 takes the form of a hollow cylinder. The composite plates 41, each similar in construction to those illustrated in Figs. 1, 2 and 4, are positioned radially in grooves 42 and 43 formed in the casing 40 and cover plate 44 respectively to form a cell series. The ampoule 45 containing the liquid electrolyte 46 is also of hollow cylindrical shape and is positioned in the cavity 47 defined by the radially arranged plates 41.

In this embodiment, as in Fig. 1, the two end plates 48 and 49 of the series of cells are cemented or otherwise secured to plastic block 50 and are respectively in electrical contact with terminal leads 51 and 52. The principal advantage for the structure of the embodiment illustrated in Figs. 6 and 7 resides in the provision of the central opening 53 through which may be passed electrical leads connected to other components of the proximity fuze. In this modification, as in the form illustrated in Fig. 1, the battery is assembled in the projectile with its longitudinal axis coinciding with the axis of spin of the projectile. Openings 54 are also provided in the several plates 41 and serve as a means for utilizing centrifugal force resulting from the rotation of the projectile effectively to distribute the electrolyte uniformly and force it into electro-chemical contact with the electrodes, irrespective of the position of the said projectile during flight.

In the modification illustrated in Figs. 6 and 7, in one size of the device, the volume of the space between the plates may be 8.3 cm.$^3$, and the volume of electrolyte contained within the ampoule 5.8 cm.$^3$, so that on equal distribution of the electrolyte approximately 71% of the available plate area will be utilized. For example, assuming 60 plates are provided, with a minimum spacing of 1.5 mm. and with each plate (0.7 cm.$\times$1.7 cm.) 1.2 square centimeter in area, the effective plate coverage will be approximately 0.85 cm.$^2$ per plate. By utilizing a volume of liquid electrolyte less than total volume of the spaces between the plates the likelihood of serious short-circuiting of the cells at the plate edges, by the electrolyte, will be eliminated since the electrolyte will be driven into the cell assemblies under radial acceleration due to spin and will be held there in electrochemical contact with the plates independently of the projectile's position in flight.

Having thus described my invention, I claim:

1. An electric battery for fuzed projectiles including a casing, a plurality of electrodes the opposite sides of which are provided with coatings of dissimilar metals of the electrochemical series, said electrodes being spaced and arranged radially in the casing and defining an axial cavity, an electrolyte, and a frangible ampoule containing the electrolyte and mounted in the cavity, said ampoule being shattered upon discharge of the projectile from a rifled ordnance, the inertial forces incident to the projectile discharge forcing the electrolyte downwardly and laterally in the casing and between the electrodes to cooperate therewith to form a plurality of electric cells.

2. An electric battery as recited in claim 1, including means for assuring uniform electrolyte distribution throughout the cells.

3. An electric battery as recited in claim 1, including means assuring uniform electrolyte distribution throughout the cells, said means comprising an opening in each electrode assembly a predetermined distance from the inner edge thereof.

4. In an electric battery, a hollow cylindrical casing having inner and outer cylindrical walls, a plurality of bi-polar electrodes arranged radially in the casing, each of said bi-polar electrodes being secured to the outer cylindrical wall of said casing and extending inwardly radially thereof a distance less than the distance of said outer wall to said inner wall whereby to define an annular cavity, an electrolyte, and an annular electrolyte container in the cavity.

5. An electric battery comprising a plurality of electrically conductive plates each having a coating of dissimilar metal of the electrochemical series applied to opposite sides thereof, a casing, means supporting said plates within said casing whereby said plates will extend in a radial pattern with the juxtaposed faces of said plates having dissimilar metal coatings, and means for bringing an electrolyte into electro-chemical and electrically conductive relationship with said plates whereby to form a multicelled battery having each cell connected in series by its respective electrically conductive plates to which the coatings are applied.

6. In an electric battery, a cylindrical casing, a plurality of electrically conductive plates, means securing said plates to the outer cylindrical wall of said casing so that the plates will project inwardly of the casing in a radial fashion, each of said plates having a width less than the radius of said cylindrical casing whereby to define a central cavity, and a frangible ampoule containing an electrolyte supported in said cavity whereby on fracture of said ampoule said electrolyte will flow into the sector-shaped cavities defined by the outer wall of said casing and the juxtaposed faces of said plates.

ARNOLD PITT.

REFERENCES CITED

The following references are of record in the file of this patent:

UNITED STATES PATENTS

| Number | Name | Date |
|---|---|---|
| 341,536 | Zalinski | May 11, 1886 |
| 1,328,393 | Rabe | Jan. 20, 1920 |
| 1,333,295 | Drambourg | Mar. 9, 1920 |
| 2,147,116 | Winckler | Feb. 14, 1939 |
| 2,403,567 | Wales | July 9, 1946 |

FOREIGN PATENTS

| Number | Country | Date |
|---|---|---|
| 17,824 | Great Britain | of 1909 |
| 336,844 | Great Britain | Oct. 23, 1930 |

OTHER REFERENCES

Selvidge, H.: Electronics, February, 1946, page 109.